(12) United States Patent
Lin (10) Patent No.: US 9,846,667 B2
(45) Date of Patent: Dec. 19, 2017

(54) SWITCH APPARATUS AND ELECTRONIC DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 252 days.

(21) Appl. No.: 14/455,253

(22) Filed: Aug. 8, 2014

(65) Prior Publication Data

US 2015/0046629 A1   Feb. 12, 2015

(30) Foreign Application Priority Data

Aug. 9, 2013   (CN) .................. 2013 1 03451376

(51) Int. Cl.
*G06F 13/00*   (2006.01)
*G06F 13/40*   (2006.01)

(52) U.S. Cl.
CPC ................. *G06F 13/4022* (2013.01)

(58) Field of Classification Search
CPC .................................................. G06F 13/4022
USPC ................................................. 710/316, 317
See application file for complete search history.

(56) References Cited

U.S. PATENT DOCUMENTS

| | | | | |
|---|---|---|---|---|
| 3,832,694 A * | 8/1974 | Judith | ................. | G06F 15/7864 710/1 |
| 4,014,005 A * | 3/1977 | Fox | ..................... | G06F 11/2025 710/317 |
| 5,070,449 A * | 12/1991 | Dawson | ................ | G06F 13/122 340/2.1 |
| 5,428,800 A * | 6/1995 | Hsieh | .................. | G06F 13/4004 326/82 |
| 5,502,837 A * | 3/1996 | Hoffert | ................. | G09G 5/395 345/506 |
| 5,636,368 A * | 6/1997 | Harrison | ............. | G06F 17/5054 326/38 |
| 5,757,207 A * | 5/1998 | Lytle | ...................... | G11C 19/00 326/39 |
| 5,794,062 A * | 8/1998 | Baxter | .................... | G06F 8/447 710/317 |
| 5,848,066 A * | 12/1998 | Nazarian | .......... | H03K 19/17736 340/2.28 |
| 5,937,176 A * | 8/1999 | Beasley | .................. | G06F 3/023 348/525 |
| 6,101,565 A * | 8/2000 | Nishtala | ............. | G06F 13/4018 710/307 |
| 6,230,229 B1 * | 5/2001 | Van Krevelen | ......... | G06F 13/36 710/107 |
| 6,334,163 B1 * | 12/2001 | Dreps | ...................... | G06F 5/06 710/260 |

(Continued)

*Primary Examiner* — Paul R Myers
(74) *Attorney, Agent, or Firm* — Steven Reiss (57) ABSTRACT

An electronic device connected to numerous first load medias and second load medias. The electronic device comprises a processor and a switch module. The processor is capable of switching between a first working mode and a second working mode. Under the second working mode, the processor generates a second control signal, the switch mode establishes independent electronic connections between specified first load medias and specified second load medias, thus, the first load medias and the second load medias simultaneously communicate with each other through the electronic device.

6 Claims, 6 Drawing Sheets

(56) References Cited

U.S. PATENT DOCUMENTS

| | | | | |
|---|---|---|---|---|
| 6,633,945 B1* | 10/2003 | Fu | ............... | G06F 12/0813 709/213 |
| 6,636,933 B1* | 10/2003 | MacLellan | ............... | G06F 13/4022 710/317 |
| 6,691,198 B1* | 2/2004 | Hamlin | ............... | G06F 3/0613 710/240 |
| 6,988,162 B2* | 1/2006 | Goergen | ............... | H04Q 1/10 710/300 |
| 7,171,504 B2* | 1/2007 | Ishii | ............... | H04L 41/00 709/239 |
| 7,461,234 B2* | 12/2008 | Ray | ............... | G06F 9/3001 712/10 |
| 7,643,493 B1* | 1/2010 | Sayrafian-Pour | ............... | H04L 49/254 370/231 |
| 7,869,440 B2* | 1/2011 | Lisitsa | ............... | G06F 15/8053 370/395.7 |
| 8,099,703 B1* | 1/2012 | Manovit | ............... | G06F 17/504 716/103 |
| 8,788,718 B2* | 7/2014 | Lida | ............... | G06F 3/1454 345/1.1 |
| 2001/0012127 A1* | 8/2001 | Fukuda | ............... | G06T 1/20 358/444 |
| 2005/0050283 A1* | 3/2005 | Miller | ............... | G06F 9/526 711/150 |
| 2005/0177670 A1* | 8/2005 | Fujimoto | ............... | G06F 13/4022 710/317 |
| 2005/0219899 A1* | 10/2005 | Kishi | ............... | G06F 3/0613 365/185.11 |
| 2006/0206657 A1* | 9/2006 | Clark | ............... | G06F 13/362 710/317 |
| 2007/0162949 A1* | 7/2007 | Nitta | ............... | H04N 5/772 725/134 |
| 2007/0233906 A1* | 10/2007 | Tatum | ............... | G06F 13/28 710/26 |
| 2007/0260805 A1* | 11/2007 | Siemers | ............... | G06F 15/7867 710/317 |
| 2008/0048749 A1* | 2/2008 | Onodera | ............... | H03K 5/1506 327/269 |
| 2008/0222341 A1* | 9/2008 | Lin | ............... | G06F 13/426 710/316 |
| 2009/0240869 A1* | 9/2009 | O'Krafka | ............... | G06F 12/0284 711/103 |
| 2010/0064076 A1* | 3/2010 | Chen | ............... | G06F 13/4022 710/63 |
| 2011/0145451 A1* | 6/2011 | Soffer | ............... | G06F 3/023 710/64 |
| 2011/0280307 A1* | 11/2011 | MacInnis | ............... | G06T 9/00 375/240.15 |
| 2012/0079162 A1* | 3/2012 | Jaramillo | ............... | G09G 5/006 710/316 |
| 2012/0084479 A1* | 4/2012 | Hale | ............... | G06F 13/409 710/301 |
| 2012/0191894 A1* | 7/2012 | Sasaki | ............... | G06F 13/387 710/313 |
| 2012/0271930 A1* | 10/2012 | Tsuchida | ............... | H04L 49/40 709/223 |
| 2012/0287344 A1* | 11/2012 | Choi | ............... | H04N 5/265 348/705 |
| 2014/0143470 A1* | 5/2014 | Dobbs | ............... | G06F 15/76 710/308 |

* cited by examiner

SWITCH APPARATUS AND ELECTRONIC DEVICE

CROSS-REFERENCE TO RELATED APPLICATIONS

This application claims priority to Chinese Patent Application No. 201310345137.6 filed on Aug. 9, 2013 in the China Intellectual Property Office, the contents of which are incorporated by reference herein.

FIELD

The present disclosure relates to a switch apparatus.

BACKGROUND

Television only accesses an external device for displaying images and videos stored in the external device.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

An electronic device capable of simultaneously establishing independent connection between first load medias and second load medias is described.

Figure 1:
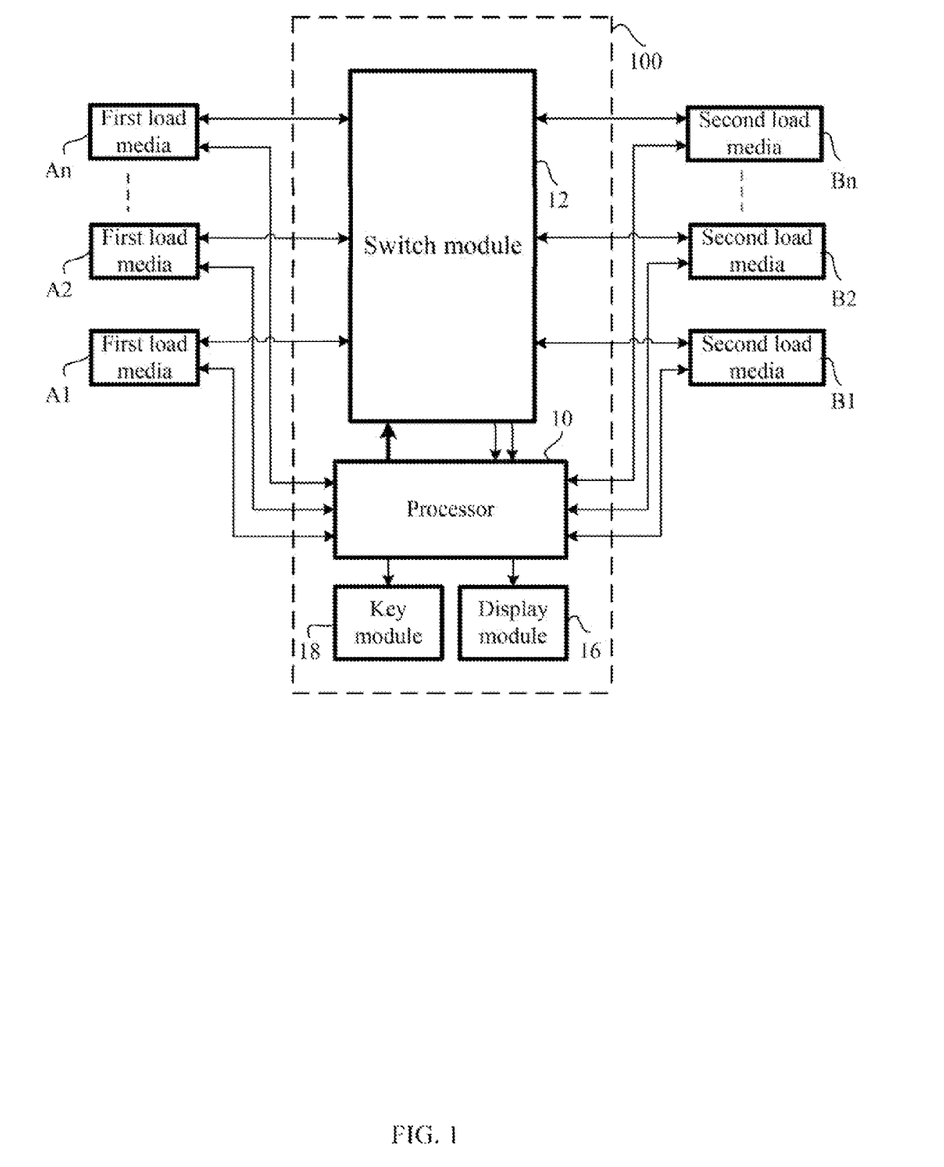
FIG. 1 is a block diagram of an embodiment of an electronic device connected to a plurality of first load medias and second load medias, the electronic device comprising a processor and a switch module.

FIG. 1 illustrates an embodiment of an electronic device 100 connected between a plurality of first load medias A1-An and a plurality of second load medias B1-Bn. In at least one embodiment, the electronic device 100 can connects wirelessly with any or all of the first load medias A1-An. In other embodiments, the electronic device 100 connects via wires with the three load medias A1-An.

The electronic device 100 includes a processor 10, a switch module 12, a display module 16, and an inputting module 18.

The processor 10 connects with the first load medias A1-An and the second load medias B1-Bn, the switch module 12, the display module 16, and the inputting module 18. The processor 10 is capable of switching between a first working mode and a second working mode. The processor 10 obtains the operation interface information of the first load medias A1-An and the second load medias B1-Bn to be displayed on the display module 16. In the first working mode, one of the first load medias A1-An and one of the second load medias B1-Bn are selected by user, and the processor 10 generates a first control signal. In the second working mode, one of the first load medias A1-An and at least two of the second load media are selected by user, and the processor 10 generates a second control signal. In at least one embodiment, a predetermined key (not shown) of the inputting module 18 is pressed to switch between the first working mode and the second working mode. The processor 10 also executes one or more computerized codes and other applications of the electronic device 100 to provide functions of the modules.

The switch module 12 makes connections and breaks connections between the first load medias A1-An and second load medias B1-Bn. The switch module 12 turns on to establish an electrical connection between the selected first load media and the selected second load medias in response to the first control signal. Thus the selected first load media and the selected second load medias are in communication with each other. The switch module 12 turns on to establish independent electrical connections between the selected load medias and the selected at least two second load medias in response to the second control signal. Thus the selected first load medias can simultaneously communicate with the selected at least two second load medias. In at least one embodiment, the communication is a bi-directional data transfer process.

The switch module 12 further generates a locking signal when a read/write operation is occurred between the selected first load media and the selected second load media(s). The processor 10 further controls the switch module 12 to be a locked state in response to the locking signal for preventing interruption to the read/write operation.

The switch module 12 further generates a unlocking signal when the read/write operation is finished between the selected first load media and the selected second media(s). The processor 10 further controls the switch module 12 to be cut off in response to the unlocking signal for cutting off the connection(s) between the selected first load media and the selected second load media(s).

The display module 16 connects with the processor 10. The display module 16 displays interface information which is obtained by the processor 10. The display module 16 further displays the video signal transmitted between the selected first load media and the second load media when the processor 10 is in the first working mode. The display module 16 further displays the video signals transmitted between the selected first load medias and the selected second load medias in a picture when the processor 10 is in the second working mode. The video signals are displayed in a picture-in-picture manner, or in different windows in the same size. In at least embodiment, the display module 16 can be a touch screen.

The inputting module 18 connects with the processor 10. The inputting module 18 switches the working mode of the processor 10. In at least one embodiment, the inputting module 18 can be a virtual keyboard on the display module 16 or buttons presented on the electronic device 100.

Figure 2:
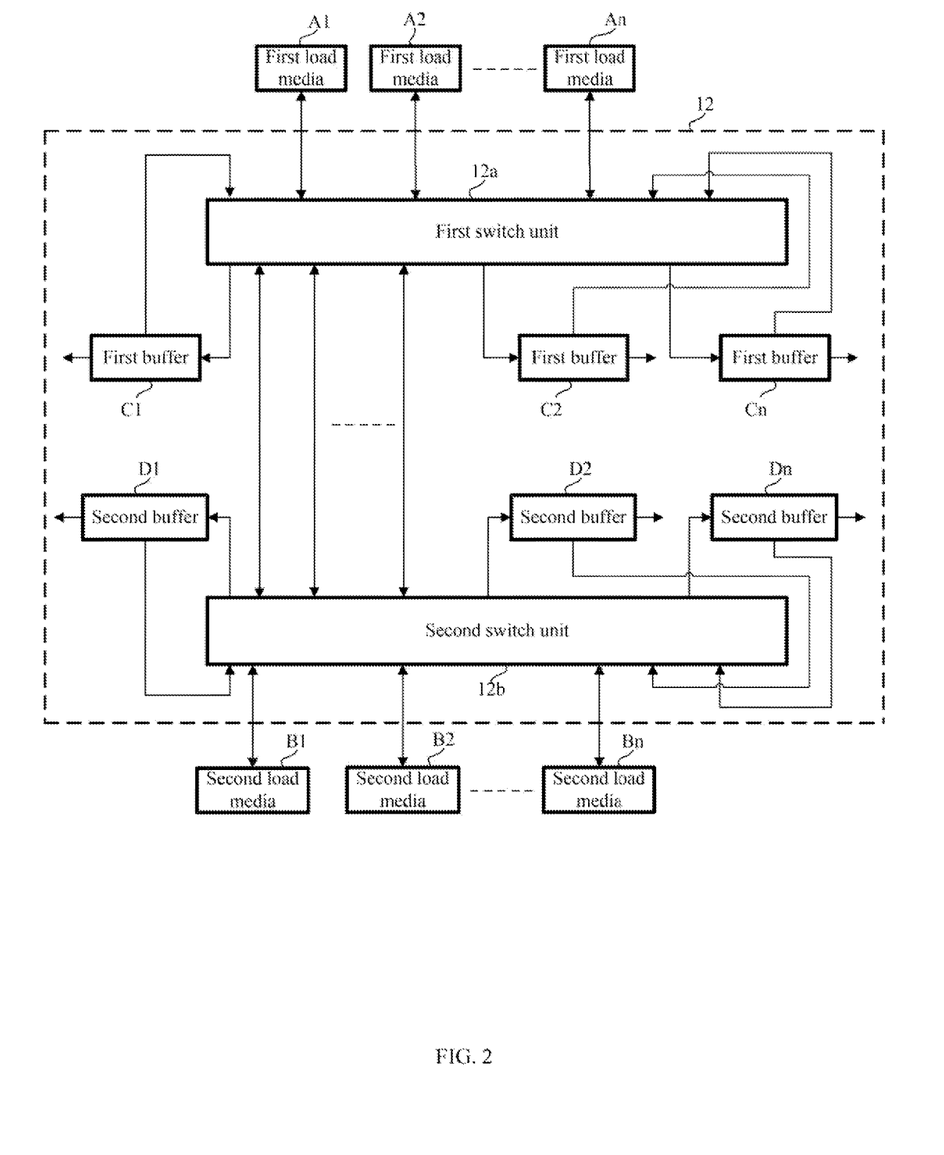
FIG. 2 is a block diagram of an embodiment of the switch module of FIG. 1 the electronic device of FIG. 1, the switch module includes a first switch unit and a second switch unit.
Figure 3:
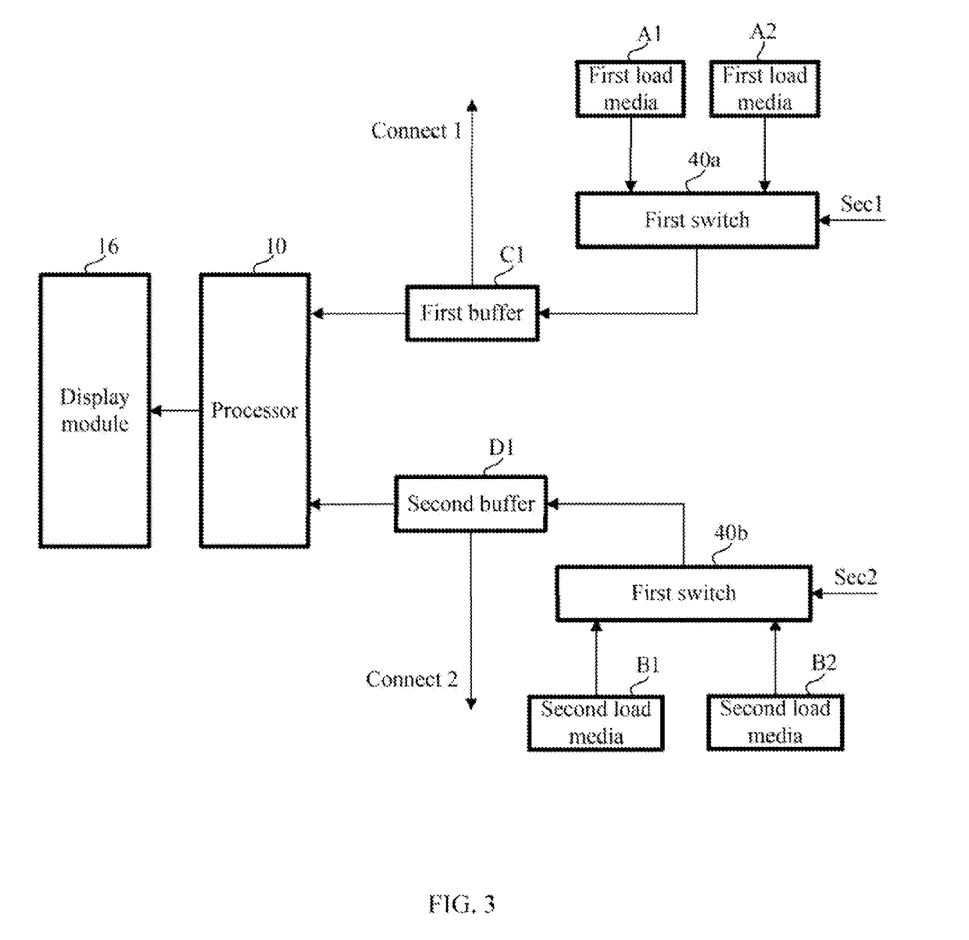
FIG. 3 is a partial block diagram of an embodiment of the first switch unit and the second switch unit of FIG. 2.
Figure 4:
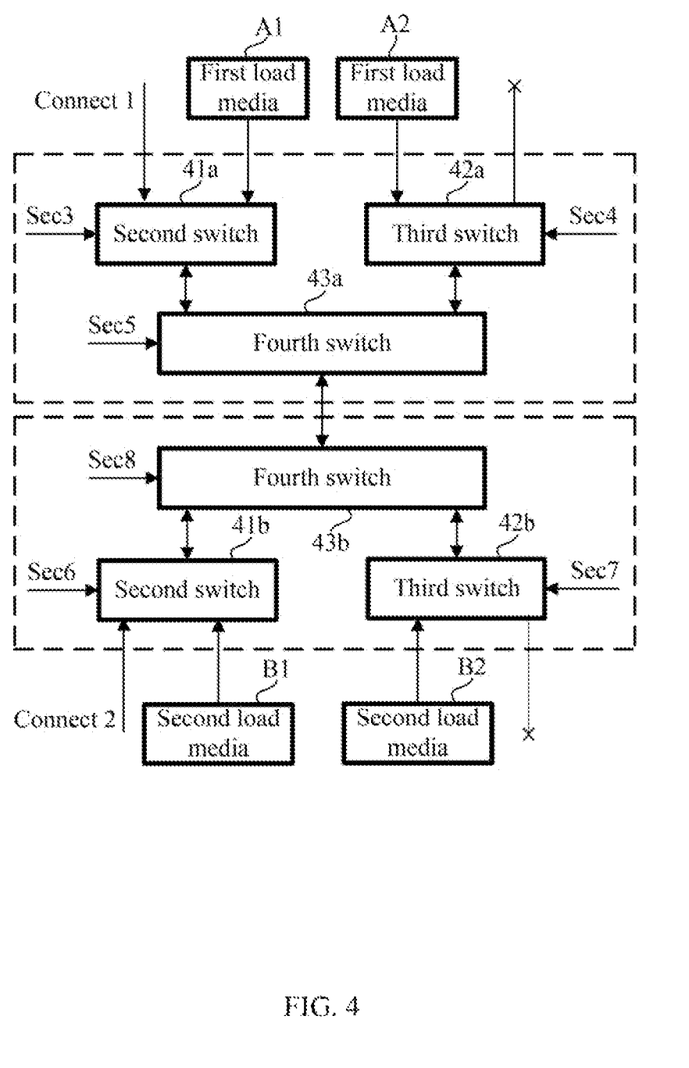
FIG. 4 is a partial block diagram of an embodiment of the first switch unit and the second switch unit of FIG. 2.
Figure 5:
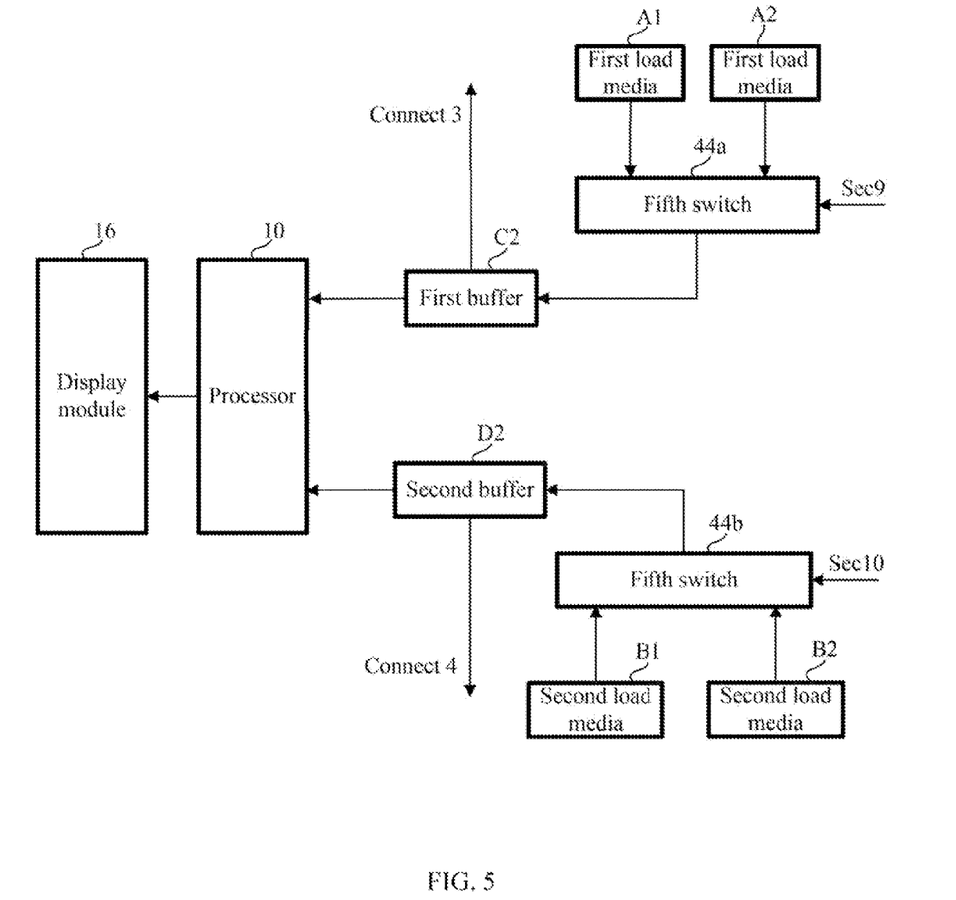
FIG. 5 is a partial block diagram of an embodiment of the first switch unit and the second switch unit of FIG. 2.
Figure 6:
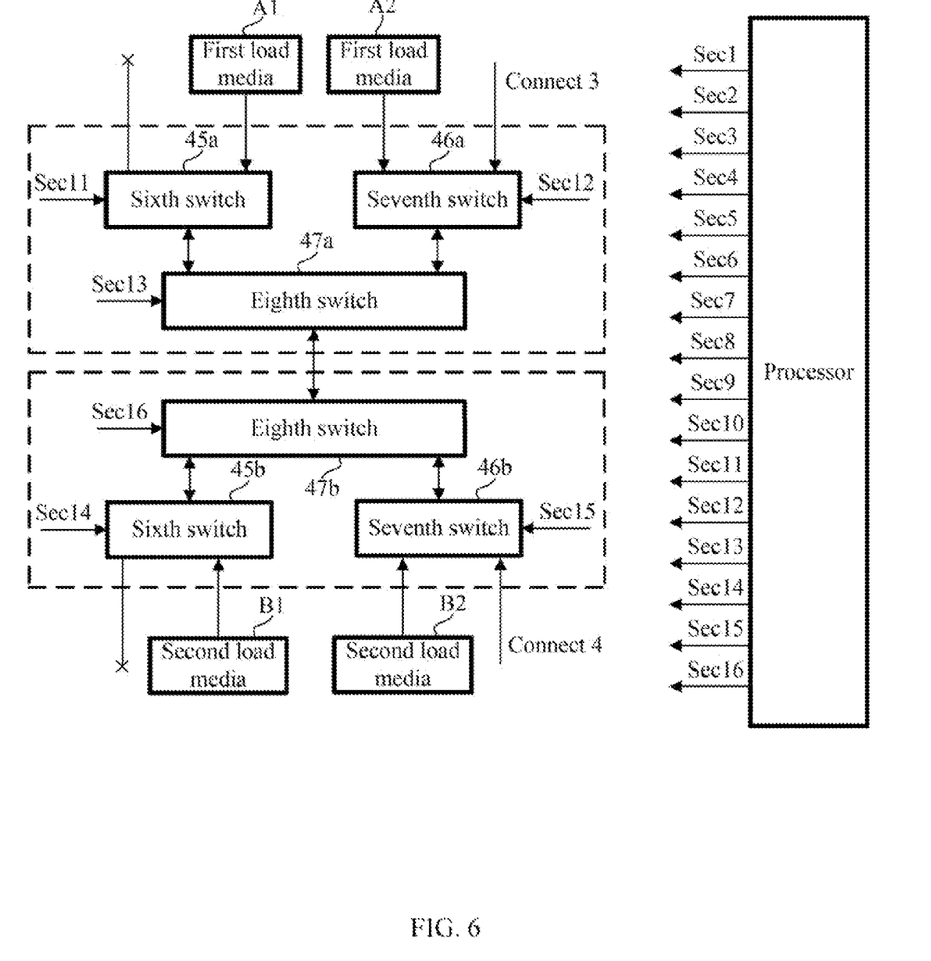
FIG. 6 is a partial block diagram of an embodiment of the first switch unit and the second switch unit of FIG. 2.

FIG. 2 illustrates that the switch module 12 can include a first switch unit 12a, a second switch unit 12b, a plurality of first buffers C1-Cn, and a plurality of second buffers D1-Dn. The first switch unit 12a connects to the first load medias A1-An, the second switch 12b, and the first buffers C1-Cn. The second switch unit 12b connects to the second load media B1-Bn, and the second buffers D1-Dn.

Each of the first switch unit 12a and the second switch unit 12b includes a first terminal and a second terminal.

Each of the first buffers C1-Cn and the second buffers D1-Dn includes an inputting terminal, a first outputting terminal, and a second outputting terminal Each of the inputting terminal of the first buffers C1-Cn is connected to the first terminal of the first switch unit 12a. Each of the first outputting terminal of the first buffers C1-Cn is connected to the second terminal of the first switch unit 12a. Each of the second outputting terminal of the first buffers C1-Cn is connected to the processor 10. Each of the inputting terminal of the second buffers D1-Dn is connected to the first terminal of the second switch unit 12b. Each of the first outputting terminal of the first buffers D1-Dn is connected to the second terminal of the second switch unit 12b. Each of the second outputting terminal of the first buffers D1-Dn is connected to the processor 10.

FIGS. 3-6 illustrate that the electronic device 100 includes two first load medias A1-A2, two second load medias B1-Bn, two first buffer C1-C2, and two second buffer D1-D2. The first switch unit 12a includes a first switch 40a, a second switch 41a, a third switch 42a, a fourth switch 43a, a fifth switch 44a, a sixth switch 45a, a seventh switch 46a, and a eighth switch 47a. The second switch unit 12b includes a first switch 40b, a second switches 41b, a third switch 42b, a fourth switch 43b, a fifth switch 44b, a sixth switch 45b, a seventh switch 46b, and a eighth switch 47b.

Each of the first switches 40a, 40b, the second switches 41a, 41b, the third switch 42a, 42b, the fourth switch 43a, 43b, the fifth switch 44a, 44b, the sixth switch 45a, 45b, the seventh switch 46a, 46b, and the eighth switch 47a, 47b include a first inputting end, a second inputting end, an outputting end, and a controlling end.

The first inputting end and the second inputting end of the first switch 40a are connected to the first load medias A1-A2 respectively. The outputting end of the first switch 40a is connected to the first inputting terminal of the first buffer C1.

The first inputting end and the second inputting end of the first switch 40b are connected to the second load medias B1-B2 respectively. The outputting end of the first switch 40b is connected to the first inputting terminal of the second buffer D1.

The first inputting ends of the second switches 41a, 41b, are connected to the first outputting terminal of the first buffer C1 and the second buffer D1 respectively. The second inputting ends of the second switches 41a, 41b are connected to the first load medias A1 and the second load media B1 respectively. The outputting ends of the second switches 41a, 41b are connected to first inputting end of the fourth switches 43a, 43b respectively.

The first inputting ends of the third switches 42a, 42b are connected to the first load media A2 and the second load media B2 respectively. The second inputting ends of the third switches 42a, 42b are floated. The outputting ends of the third switches 42a, 42b are connected to the second inputting end of the fourth switches 43a, 43b. The outputting end of the fourth switch 43a is connected to the fourth switch 43b.

The first inputting end and the second inputting end of the fifth switch 44a are connected to the first load medias A1-A2 respectively. The outputting end of the fifth switch 44a is connected to the first inputting terminal of the first buffer C2.

The first inputting end and the second inputting end of the fifth switch 44b are connected to the second load medias B1-B2 respectively. The outputting end of the fifth switch 44b is connected to the first inputting terminal of the second buffer D2.

The first inputting ends of the sixth switches 45a, 45b, are connected to the first outputting terminal of the first buffer C2 and the second buffer D2 respectively. The second inputting ends of the sixth switches 45a, 45b are connected to the first load medias A1 and the second load media B1 respectively. The outputting ends of the sixth switches 45a, 45b are connected to first inputting end of the eighth switches 47a, 47b respectively.

The first inputting ends of the seventh switches 46a, 46b are connected to the first load media A2 and the second load media B2 respectively. The second inputting ends of the seventh switches 46a, 46b are floated. The outputting ends of the seventh switches 46a, 46b are connected to the second inputting end of the eighth switches 47a, 47b. The outputting end of the eighth switch 47a is connected to the eighth switch 43b.

The controlling ends of the first switches 40a, 40b, the second switches 41a, 41b, the third switch 42a, 42b, the fourth switch 43a, 43b, the fifth switch 44a, 44b, the sixth switch 45a, 45b, the seventh switch 46a, 46b, and the eighth switch 47a, 47b are connected to the processor 10.

The processor 10 can include a plurality of pins Sec1-Secn. The Sec1-Secn pins are electrically connected to the controlling ends of the first switches 40a, 40b, the second switches 41a, 41b, the third switch 42a, 42b, the fourth switch 43a, 43b, the fifth switch 44a, 44b, the sixth switch 45a, 45b, the seventh switch 46a, 46b, and the eighth switch 47a, 47b in a one-to-one relationship.

In at least one embodiment, under the first working mode, when the first load media A1 and the second load media B1 are selected, the first switch 40a or 40b turns on. If the first switch 40a turns on, which cause the first load media A1 and the first buffer C1 to be electrically connected for transmitting signals from the first load media A1 to the second load media B1. The second switch 41a turns on, which cause the first buffer C1 and the fourth switch 43a to be electrically connected. The fourth switch 43a turns on, which cause the second switch 41a and the fourth switch 43b to be electrically connected. The second switch 41b turns on, which cause the second load media B1 and the fourth switch 43b to be electrically connected. The fourth switch 43b turns on, which cause the fourth switch 43a and the second switch 41b to be electronically connected. Thus, the first load media A2 communicates with the second load media B2.

If the first switch 40b turns on, which cause the second load media B1 and the second buffer D1 to be electrically connected for transmitting signals from the second load media B1 to the first load media A1. The second switch 41b turns on, which cause the second buffer D1 and the fourth switch 43b to be electrically connected. The fourth switch 43b turns on, which cause the second switch 41b and the fourth switch 43a to be electrically connected. The second switch 41a turns on, which cause the first load media A1 and the fourth switch 43a to be electrically connected. The fourth switch 43a turns on, which cause the fourth switch 43b and the second switch 41a to be electronically connected. Thus, the first load media A1 communicates with the second load media B1.

When the first load media A2 and the second load media B2 are selected, the fifth switch 44a or 44b turn on. If the fifth switch 44a turns on, which cause the first load media A2 and the first buffer C2 to be electrically connected for transmitting signals from the first load media A2 to the second load media B2. If the fifth switch 44b turns on, which cause the second load media B2 and the second buffer D2 to be electrically connected for transmitting signals from the second load media B2 to the first load media A2. The sixth switch 45a turns on, which cause the first buffer C2 and the eighth switch 47a to be electrically connected. The eighth switch 47a turns on, which cause the eighth switch 47b and the sixth switch 45a to be electronically connected. Thus, the first load media A2 communicates with the second load media B2.

If the fifth switch 44b turns on, which cause the second load media B2 and the second buffer D2 to be electrically connected for transmitting signals from the second load media B2 to the first load media A2. The sixth switch 45b turns on, which cause the second buffer D2 and the eighth switch 47b to be electrically connected. The eighth switch 47b turns on, which cause the sixth switch 45b and the eighth switch 47a to be electrically connected. The sixth switch 45a turns on, which cause the first load media A2 and the eighth switch 47a to be electrically connected. The eighth switch 47a turns on, which cause the eighth switch 47b and the sixth switch 45a to be electronically connected. Thus, the first load media A2 communicates with the second load media B2.

In use, the electronic device 100 is capable of connecting and communicating between a selected first load media and a selected second load media, or connecting and communicating between the selected first load media and the selected second load medias simultaneously. Thus, communication convenience between first load medias and second load medias increases.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device connected with a plurality of first load medias and a plurality of second load medias, the electronic device comprising:
   a processor configured to generate different control signals and directly coupled to the plurality of first load medias and the plurality of second load medias to obtain operation interface information of the plurality of first load medias and the plurality of second load medias; and
   a switch module coupled to the processor, the first load medias, and the second load medias,
   wherein the processor is capable of switching between a first working mode and a second working mode;
   in the first working mode, when a specified first load media and a specified second load media are selected, the processor generates a first control signal, and the switch module establishes an electronic connection between the specified first load media and the specified second load media, in response to the first control signal generated by the processor, the switch module transmits a video signal, which is transmitted between the selected specified first load media and the selected specified second load media, to the processor;
   in the second working mode, when at least two first load medias and at least two second load medias are selected, the processor generates a second control signal, and the switch module establishes independent electronic connections between the at least two selected first load media and the at least two selected second load medias; and the at least two selected first load medias simultaneously communicate with the corresponding at least two selected second load medias, the switch module further transmits video signals, which are transmitted between the selected at least two selected first load medias and the selected at least two selected second load medias, to the processor;
   wherein the switch module comprises a first switch unit, a second switch unit, a plurality of first buffers, and a plurality of second buffers; the first switch unit connects to the first load medias, the second switch, and the first buffers; the second switch unit connects to the second load media, and the second buffers; each of the first switch unit and the second switch unit includes a first terminal and a second terminal; each of the first buffers and the second buffers includes an inputting terminal, a first outputting terminal, and a second outputting terminal; each of the inputting terminal of the first buffers is connected to the first terminal of the first switch unit; each of the first outputting terminal of the first buffers is connected to the second terminal of the first switch unit; each of the inputting terminal of the second buffers is connected to the first terminal of the second switch unit; each of the first outputting terminal of the first buffers is connected to the second terminal of the second switch unit; each of the second outputting terminals of the first buffers and the second buffers is connected to the processor.

2. The electronic device of claim 1, wherein there are two first load medias, two second load medias, two first buffers, and two second buffers; each of the first switch unit and the second switch unit comprises a first switch, a second switch, a third switch, and a fourth switch; each of the first switch, the second switch, the third switch, and the fourth switch is controlled by the processor; under the first working mode, for transmitting signals from the selected first load media to the selected second load media, the signals passes through the first switch of the first switch unit connected to the selected first load media, the corresponding first buffer, the second switch of the first switch unit, the fourth switch of the first switch unit, the fourth switch of the second switch unit, and the second switch of the second switch unit orderly.

3. The electronic device of claim 2, wherein under the first working mode, for transmitting signals from the selected second load media to the selected first load media, the signals passes through the first switch of the second switch unit connected to the selected second load media, the corresponding second buffer, the second switch of the second switch unit, the fourth switch of the second switch unit, the fourth switch of the first switch unit, and the second switch of the first switch unit orderly.

4. A switch apparatus in an electronic device connected with a plurality of first load medias and a plurality of second load medias besides the electronic device; the switch apparatus working under a first working mode or a second working mode; the switch apparatus comprising:
a switch module connected between to the first load medias and the second load medias; and
a processor directly coupled to the plurality of first load medias and the plurality of second load medias to obtain operation interface information of the plurality of first load medias and the plurality of second load medias;
under the second working mode, the switch module establishes independent electronic connections between at least two selected first load media and at least two selected second load medias; and the at least two selected first load medias simultaneously communicate with the corresponding at least two selected second load medias, the switch module transmits video signals, which are transmitted between the at least two selected first load medias and the at least two selected second load medias, to the processor;
wherein the switch module comprises a first switch unit, a second switch unit, a plurality of first buffers, and a plurality of second buffers; the first switch unit connects to the first load medias, the second switch, and the first buffers; the second switch unit connects to the second load medias, and the second buffers; each of the first switch unit and the second switch unit includes a first terminal and a second terminal; each of the first buffers and the second buffers includes an inputting terminal, a first outputting terminal, and a second outputting terminal; each of the inputting terminal of the first buffers is connected to the first terminal of the first switch unit; each of the first outputting terminal of the first buffers is connected to the second terminal of the first switch unit; each of the inputting terminal of the second buffers is connected to the first terminal of the second switch unit; each of the first outputting terminal of the first buffers is connected to the second terminal of the second switch unit; each of the second outputting terminals of the first buffers and the second buffers is connected to the processor.

5. The switch apparatus of claim 4, wherein there are two first load media, two second load medias, two first buffers, and two second buffers; each of the first switch unit and the second switch unit comprises a first switch, a second switch, a third switch, and a fourth switch; each of the first switch, the second switch, the third switch, and the fourth switch is controlled by the processor; under the first working mode, for transmitting signals from the selected first load media to the selected second load media, the signals passes through the first switch of the first switch unit connected to the selected first load media, the corresponding first buffer, the second switch of the first switch unit, the fourth switch of the first switch unit, the fourth switch of the second switch unit, and the second switch of the second switch unit orderly.

6. The switch apparatus of claim 5, wherein under the first working mode, for transmitting signals from the selected second load media to the selected first load media, the signals passes through the first switch of the second switch unit connected to the selected second load media, the corresponding second buffer, the second switch of the second switch unit, the fourth switch of the second switch unit, the fourth switch of the first switch unit, and the second switch of the first switch unit orderly.

* * * * *